Aug. 31, 1948. C. C. COONS Re. 23,032

CONTINUOUS ABSORPTION REFRIGERATING SYSTEM

Original Filed Aug. 8, 1936 4 Sheets-Sheet 1

Inventor:
Curtis C. Coons,
By: Harry S. Duncan
Attorney.

Witness:
E. Camporini

CONTINUOUS ABSORPTION REFRIGERATING SYSTEM

Original Filed Aug. 8, 1936 4 Sheets-Sheet 2

Witness:
E. Camporini

Inventor:
Curtis C. Coons,
By: Harry S. Duncan
Attorney.

CONTINUOUS ABSORPTION REFRIGERATING SYSTEM

Original Filed Aug. 8, 1936 4 Sheets-Sheet 3

Inventor:
Curtis C. Coons,

By: Harry S. Duncan
Attorney.

Witness:
E. Camporini

CONTINUOUS ABSORPTION REFRIGERATING SYSTEM
Original Filed Aug. 8, 1936 4 Sheets-Sheet 4
Fig. 8.
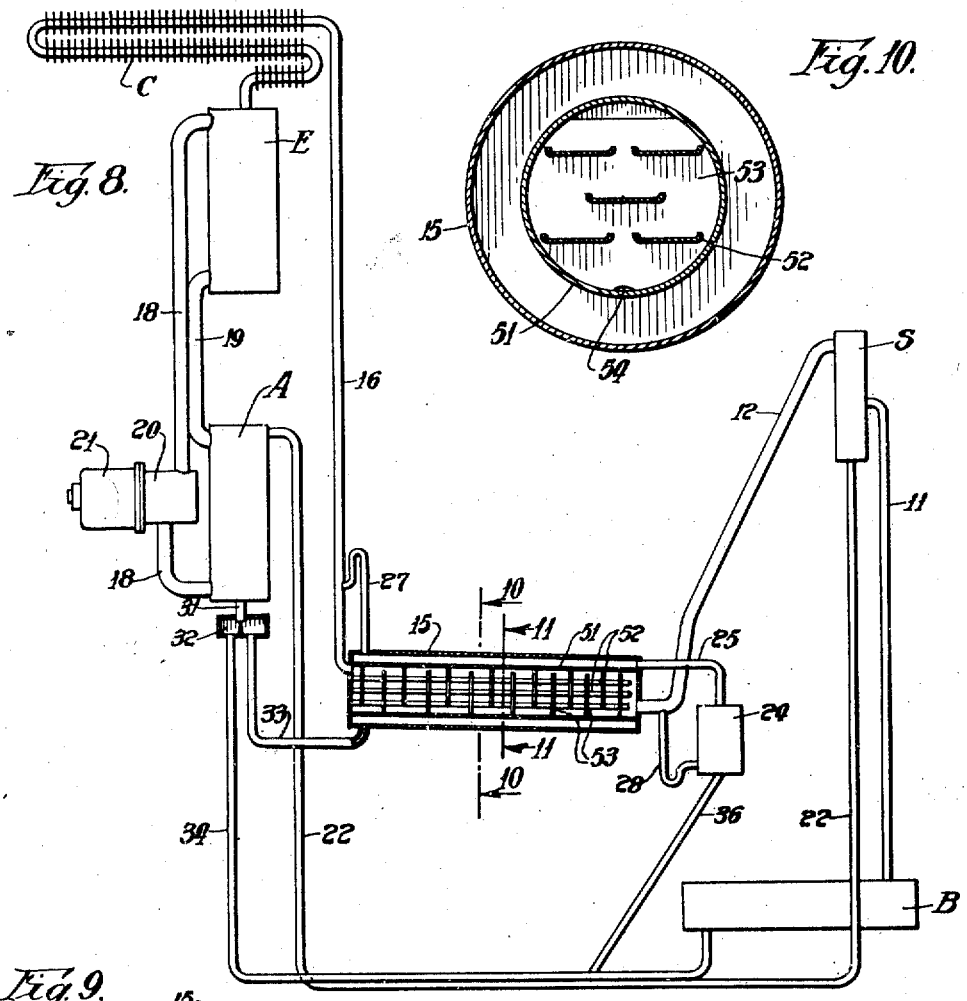
Fig. 10.
Fig. 9.
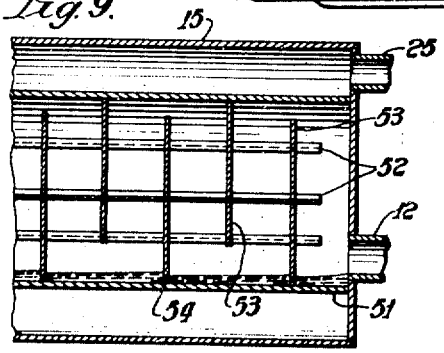
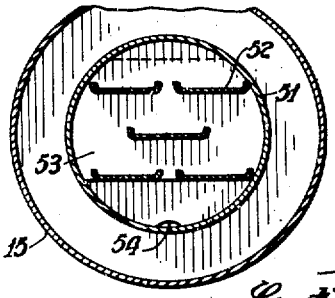
Fig. 11.
Inventor:
Curtis C. Coons,
By: Harry S. Bruare
Attorney.
Witness:
E. Camporini Reissued Aug. 31, 1948 Re. 23,032

UNITED STATES PATENT OFFICE 23,032

CONTINUOUS ABSORPTION REFRIGERATING SYSTEM

Curtis C. Coons, North Canton, Ohio, assignor to The Hoover Company, North Canton, Ohio, a corporation of Ohio Original No. 2,178,870, dated November 7, 1939, Serial No. 94,934, August 8, 1936. Application for reissue January 10, 1941, Serial No. 373,970

15 Claims. (Cl. 62—119.5)

This invention relates to continuous absorption refrigerating systems and more particularly to rectifiers and heat exchangers adapted to be used therein.

In the operation of a known type of continuous absorption refrigerating system using inert gas, approximately one fourth of the heat input to the boiler is discharged at the rectifier. The heat that is discharged from the rectifier to the cooling medium such as the air, in an air cooled absorption system is relatively high grade heat energy. If this heat is discharged to the cooling medium or to other than a part of the refrigerating system, the heat ratio of the refrigerator is not high.

By means of the present invention, it is proposed to provide a continuous absorption refrigerating system in which this heat of rectification is discharged into the strong aqua or strong solution flowing from the absorber to the boiler, thereby improving the heat ratio.

It is preferable in accordance with the present invention to discharge the heat of rectification to the strong aqua instead of to the weak aqua due to the fact that the quantity of strong aqua flowing is larger than the quantity of weak aqua by the amount of refrigerant absorbed in the absorber. Because of this it is not as practical to transfer the heat of rectification to the weak aqua.

Accordingly it is one object of the present invention to effect a savings of heat and to bring about an improvement in the heat ratio of a continuous absorption refrigerating system by transferring heat from the rectifier to the strong aqua flowing to the boiler.

It is still another object of the invention to provide an improved heat exchanger for transferring heat in the fluid leaving the boiler of a continuous absorption refrigerating system to fluid entering the boiler of that system.

It is still another object of the invention to provide an improved rectifier adapted for use in a continuous absorption refrigerating system.

In the following description, means is described for discharging heat of rectification to the strong aqua in the system. In all of the arrangements shown and described a single stage continuous absorption system using inert gas is illustrated but it is obvious that the rectifier and associated parts may be used in absorption systems which do not employ inert gas and also in systems in which two or more stages are employed. It will also be clear to those skilled in the art that the rectifier of one of the following figures may be used in other figures described herein.

Various other objects and advantages reside in certain novel features of the arrangement and construction of parts as will be apparent from the following description taken in connection with the accompanying drawings in which Figure 1 is a diagram of a continuous absorption refrigerating system using inert gas and in which a rectifier constructed in accordance with the present invention is illustrated in cross section, this arrangement showing one embodiment of the invention.

Figure 8 is a diagram of a continuous absorption refrigerating system illustrating still another embodiment of the invention and showing a horizontal rectifier in vertical cross section.

Figure 9 is an enlarged fragmentary vertical cross sectional view of the rectifier assembly shown in Figure 8.

Figure 10 is a transverse cross sectional view of the rectifier assembly shown in Figure 8, the view being taken on the line 10—10 thereof, and Figure 11 is a transverse cross sectional view of the rectifier of Figure 8, the view being taken on the line 11—11 thereof.

Figure 1:
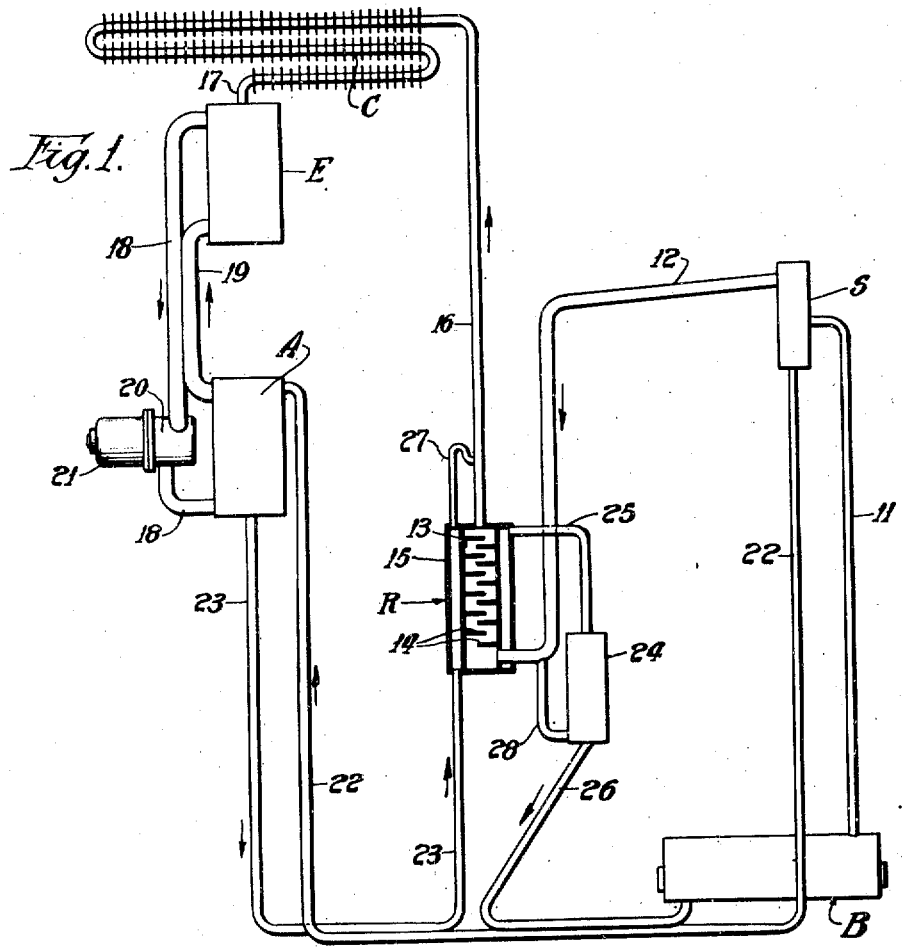

Referring to the drawings in detail, and first to the arrangement diagrammatically illustrated in Figure 1, it will be seen that a continuous absorption refrigerating system is there illustrated as consisting of a boiler B, a gas separation chamber S, the rectifier designated generally at R, a condenser C, an evaporator E and an absorber A, these vessels being connected by a number of conduits to form the complete refrigerating system.

In the arrangement of Figure 1, a gas lift pump 11 is employed for lifting absorption liquid from the boiler B into the gas separation chamber S. The refrigerant gas developed in the boiler system leaves the gas separation chamber S through the conduit 12 and enters the bottom of the rectifier proper. The rectifier consists of a vertically disposed cylinder 13 provided with a number of baffle plates 14 therein. The cylinder 13 is surrounded by an outer jacket 15 through which liquid may be circulated to remove heat from the interior of the cylinder 13 and from the baffle plates 14 therein to effect the rectification as will presently be described more in detail.

The refrigerant gas leaves the top of the rectifier 13 through the conduit 16 which conveys it to the condenser C. After the refrigerant condenses in the condenser, it flows into the evaporator through the conduit 17.

The evaporator E is connected to the absorber A by means of two inert gas conduits 18 and 19 which may be in heat exchange relation. The conduit 19 may connect the bottom of the evaporator to the top of the absorber and the conduit 18 may connect the top of the evaporator to the bottom of the absorber.

The conduit 18 may have an inert gas circulator mounted therein as shown at 20 and this circulator may be an ordinary centrifugal fan driven by a hermetically sealed electric motor 21.

A liquid conduit 22 connects the bottom of the gas separation chamber S to the top of the absorber. The bottom of the absorber is connected to the lower end of the jacket 15 on the rectifier by means of the liquid conduit 23. The top of the jacket 15 is connected to a reservoir 24 by means of a liquid conduit 25 and the bottom of the reservoir 24 is connected to the boiler B by means of the liquid conduit 26.

It will be apparent that with this arrangement of liquid conduits, liquid may flow by gravity from the gas separation chamber S through the conduit 22 into the top of the absorber and after trickling downwardly over baffle plates or the like within the absorber, flow by gravity through the conduit 23 upwardly through the jacket 15 and then downwardly through the liquid conduit 25 and the reservoir 24 back to the boiler through the conduit 26.

To prevent the accumulation of gas in the upper part of the jacket 15 a reversely bent pipe 27 may connect the top of the jacket to the refrigerant conduit 16.

The rectifier 13 must be provided with means for draining the liquid which collects therein. This is provided by the liquid drain conduit 28 connecting the lower portion of the conduit 12 to the reservoir 24.

It will be apparent from the above description that in the arrangement illustrated in Figure 1, the rectifier is located below the bottom of the absorber but above the normal level of the solution in the reservoir 24. It will also be apparent that the strong aqua leaving the absorber through the conduit 23 is brought into heat exchange relation with the fluids in the rectifier 13 by means of the jacket 15. It will also be clear that the pipes 23 and 22 may be in heat exchange relation and also that the pipe 26 which is connected to the bottom of the reservoir 24 may be in heat exchange relation with a portion of the pipe 22. The relative amounts of heat exchange area between the pipes 22 and 23 as compared with the amount of heat exchange area between the pipes 22 and 26 may be varied as desired to bring about the proper operation of the system.

The rectifier itself is essentially a heat exchanger and is part of the means for transferring heat from the fluids leaving the boiler to the strong aqua flowing to the boiler and it thus aids in the economy of heat.

While the arrangement illustrated in Figure 1 shows baffle plates within the rectifier cylinder 13, it is obvious that other filling material may be used.

The general features of the refrigerating system shown in Figure 1 are known to those skilled in the art and the operation of the system as a whole need not be described here in detail.

Figure 2:
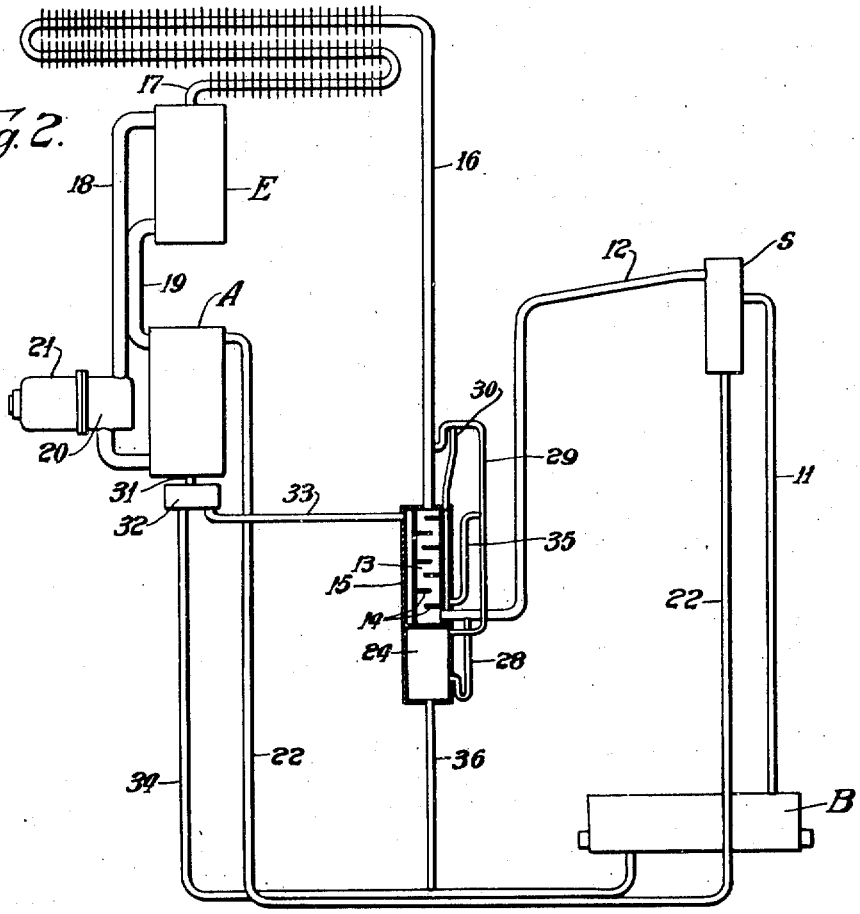
Figure 2 is a diagram of a modified form of continuous absorption refrigerating systems and illustrating a further embodiment of the invention.
Figure 3:
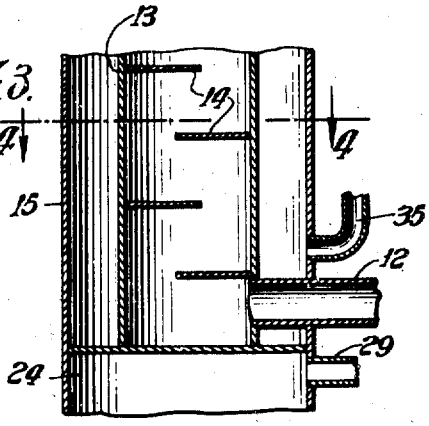
Figure 3 is a fragmentary, vertical cross sectional view of the rectifier of Figure 2 shown somewhat enlarged.
Figure 4:
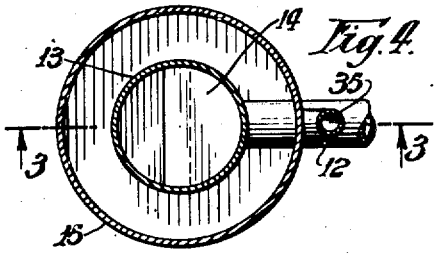
Figure 4 is a horizontal, cross sectional view of the rectifier shown in Figure 3, the view being taken on the line 4—4 thereof.

A modified form of the invention is shown in Figure 2 of the drawings. The general arrangement of the assembly may be the same as in Figure 1 and the parts which correspond are similarly designated. The rectifier assembly is combined with the reservoir into a single cylindrical arrangement, the rectifier 13 occupying the upper portion thereof and consisting of a cylindrical vessel placed within the outer casing 15. This is but a variation in details of construction from the arrangement shown in Figure 1. The reservoir 24 is vented through a conduit 29 which passes from the top of the reservoir to the conduit 16. Another vent conduit 30 connects the top of the jacket formed by the upper portion of the cylinder 15 to the upper end of the conduit 29.

An important feature of the arrangement of Figure 2 and one which differs from the arrangement of Figure 1, results from the fact that the absorption liquid leaving the absorber A through the conduit 31 is divided into two streams by means of a solution divider 32. The solution divider may consist merely of a knife blade disposed below the lower end of the pipe 31. One stream of solution flows from the dividing chamber 32 through the horizontal pipe 33 into the top of the cylinder 15 around the rectifier.

This stream is the only one which flows in heat exchange with the rectifier, the other stream passing downwardly through the conduit 34 and back to the boiler B. The stream of liquid which passes through the jacket formed by the cylinder 15 flows through the conduit 35 into the conduit 29 and from there into the reservoir 24 and drains back to the boiler through the conduit 36 connected to the conduit 34. The conduit 34 may be in heat exchange relation with the conduit 22 and the point of connection of the conduit 36 to the conduit 34 may be varied as desired to obtain the best operation of the system.

It will be apparent that the rectifier assembly of Figure 2 causes a transfer of heat to the strong aqua from the refrigerant gas flowing from the gas separation chamber through the conduit 12 to the conduit 16 in a way similar to that described above in connection with Figure 1. One difference is to be noted, however, and that is that in the arrangement of Figure 2 the absorption liquid flows downwardly through the jacket 15 whereas in Figure 1 it flows upwardly therethrough. The strong aqua thus flows in counterflow to the movement of vapors through the inner cylinder 13 of the rectifier.

Figure 5:
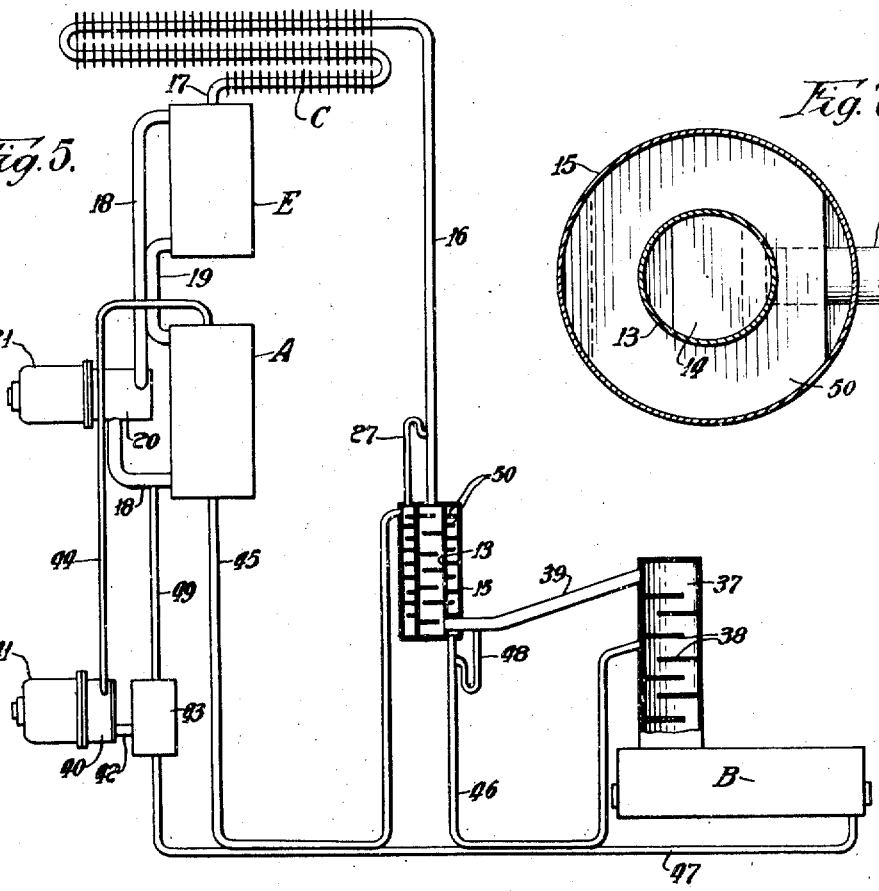
Figure 5 is a diagram of a continuous absorption refrigerating system illustrating still another embodiment of the present invention and showing the rectifier and a portion of the analyzer of the system in vertical cross section.
Figure 7:
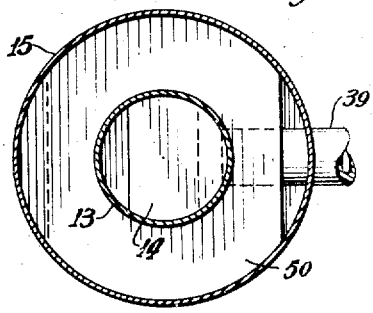
Figure 7 is a horizontal cross-sectional view of the rectifier assembly of Figure 6 taken on the line 7—7 thereof.

In the arrangement of Figures 1 and 2 a gas lift pump is employed for circulating the absorption liquid. The present invention may be advantageously carried out where some motor or power driven liquid circulating means is employed and Figure 5 illustrates one way for accomplishing this. In this figure, the boiler B is shown provided with an analyzer chamber 37 which has a number of baffle plates therein as shown at 38. The top of the analyzer chamber is connected to the bottom of the rectifier cylinder 13 by means of a conduit 39. The gases pass upwardly through the rectifier cylinder 13 and flow through the conduit 16 into the condenser C as in the arrangement of Figure 1. The evaporator and absorber may be the same as described above in connection with Figure 1 and the parts which correspond are similarly designated. Absorption liquid is circulating between the boiler, the rectifier and the absorber by means of a liquid pump diagrammatically illustrated at 40 which is adapted to be driven by an electric motor 41. Liquid is supplied to the pump 40 through the conduit 42 from a reservoir 43. The liquid is then lifted through the discharge conduit 44 of the pump into the top of the absorber and it then flows by gravity down through the absorber, then through the conduit 45 into the top of the jacket 15 surrounding the rectifier cylinder 13. The bottom of the jacket 15 is connected to some convenient point in the analyzer 37 by means of the conduit 46. After trickling downwardly over the baffle plates 38 in the analyzer, the liquid flows through the boiler B and back to the reservoir 43 through the conduit 47. Both the conduits 45 and 46 may be in heat exchange relation with the conduit 47 as in the somewhat similar arrangement in Figure 1. The heat transfer area between these conduits may be varied as desired.

The jacket 15 may be vented into the conduit 16 by means of a pipe 27 and the rectifier chamber 13 may be drained into the conduit 46 by means of the small U pipe 48 connected to the lower end of the conduit 39.

The top of the reservoir 43 should be vented by means of a conduit 49 connected to the lower end of the inert gas conduit 18.

The operation of this system is similar to that described above in connection with Figure 1, the only difference being in the means for circulating the absorption liquid.

Figure 6:
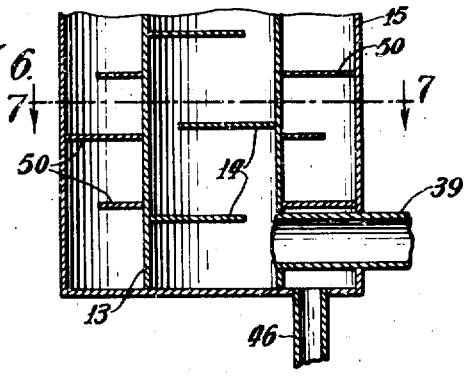
Figure 6 is an enlarged fragmentary view in cross section of the rectifier assembly shown in Figure 5.

In both of the arrangements of Figures 1 and 2, the jacket 15 surrounding the rectifier cylinder 13 is merely a plain cylinder and is maintained full of strong aqua. In the arrangement of Figure 5, on the other hand, the jacket 15 is provided with a number of baffle plates arranged in staggered relation, as best shown in Figure 6 and which are marked 50. The baffle plates 50 aid in causing the transfer of heat from the vapors in the rectifier cylinder 13 to the aqua solution in the jacket 15.

In the design of an absorption apparatus to include the special rectifier for permitting heat exchange between the hot vapors from the boiler and the strong aqua, the dimensions of the apparatus may be important if it is necessary to install the apparatus in a cabinet. In order to decrease the height to which the absorber must be elevated above the boiler to permit the use of the special heat exchange rectifier described above the use of a horizontal or slightly inclined rectifier may be employed and an arrangement of this sort is illustrated on the drawings in Figures 8 to 11 inclusive.

In the arrangement of Figure 8 a gas lift pump is employed for raising the absorption liquid as in the arrangement of Figure 1 and various other parts are the same as that in Figure 1 and are similarly designated.

A solution divider 32 is shown located below the absorber, as in the arrangement of Figure 2 and this element is similarly designated. Solution drains from the absorber through the conduit 31 into the solution divider 32 and some flows through the conduit 34 back to the boiler while others flow through the conduit 33 into the jacket 15 around the rectifier. The solution leaves the jacket 15 through the conduit 25 and flows into the reservoir 24 and from there to the conduit 36 back to the boiler, the conduit 36 joining the conduit 34.

The rectifier shown in Figures 8, 9, 10, and 11 consists of a horizontal or slightly inclined cylinder 51 provided with a number of horizontally extending baffle plates 52. The baffle plates are preferably inclined in the same angle as the cylinder 51. The trays may be supported on and held in spaced relations by means of a number of substantially vertically extending baffle plates 53 arranged in staggered relation. The baffle plates which extend down to the bottom of the cylinder 51 may be provided with small openings 54 to allow the passage of liquid therethrough. With this construction gas enters the cylinder 51 through the conduit 12 and passes upwardly and then downwardly over the trays 52, as directed by the baffle plates 53 until it leaves the cylinder 51 through the conduit 16 at the left hand end thereof, as viewed in Figure 8.

The trays 52 which pass horizontally, or substantially horizontally, through the baffle plates 53 may have slots therein for permitting the liquid to flow along each tray but in the arrangement shown a substantially tight fit is illustrated so that the liquid which collects upon the trays as the result of the rectification (which may be called the reflux solution) drips from the upper trays on to the lower one in between each of the baffle plates 53 until it collects at the bottom of the vessel 51 and is drained through the holes 54 in the alternate baffle plates 53 and leaves the rectifier through the conduit 28 connected to the lower end of the vapor supply conduit 12.

It will be seen that with this construction a large area of contact for rectification is provided and at the same time a system for transferring heat to strong aqua is provided while utilizing a slight amount of vertical space.

From the above description, it will be clear that several different types of rectifiers adapted to be cooled by strong aqua in accordance with the present invention have been illustrated and described. In all of these arrangements the rectifier is shown situated above the normal solution level in the reservoir 24 so that the rectifier can be drained by gravity flow into the boiler. It is of course within the purview of the invention to locate the rectifier partly, or entirely, below the normal solution level in the reservoir 24 and use a pump to pump the strong aqua from the level of the rectifier into the boiler.

It will also be apparent to those skilled in the art that while only a few embodiments of the invention have been illustrated and described herein, various changes may be made in the arrangement and construction of parts without departing from the spirit of the invention or the scope of the annexed claims.

I claim:

1. In an absorption refrigerating system having a boiler, an absorber, means for circulating absorption liquid between the boiler and the absorber and a liquid heat exchanger, the combination of a rectifier and means for transferring heat from the rectifier to absorption liquid flowing from the absorber to the boiler, the arrangement being such that the absorption liquid flowing from the absorber to the boiler passes first in heat exchange relation with solution flowing from the boiler to the absorber, then in heat transfer relation with the rectifier and then again in heat exchange relation with absorption solution flowing from the boiler to the absorber.

2. In a continuous absorption refrigerating system having a boiler, an absorber and means for circulating absorption liquid therebetween, the combination of a rectifier and means for transferring heat from the rectifier to absorption liquid flowing from the absorber to the boiler, both said rectifier and said heat transfer means including baffling means positioned to cause the fluids within the rectifier and the absorption liquid to flow through tortuous passageways, the arrangement being such that the liquid leaving the absorber flows by gravity in heat transfer relation with the rectifier and then by gravity to the boiler.

3. A rectifier assembly adapted for use in an absorption refrigerating system, said assembly consisting of a cylindrical vessel disposed substantially in a horizontal position, a jacket surrounding said vessel, means for supplying vapors to the inner vessel and means for supplying liquid from a part of said refrigerating system to said jacket to take up heat from the vapors in said vessel, said vessel having a plurality of substantially horizontal trays therein and a plurality of substantially vertical baffle plates in spaced, staggered relation along said trays.

4. In an absorption refrigerating apparatus, a generator including a vapor liquid lift, an absorber, a heat exchanging device, means for conducting weak absorption liquid from said generator to said absorber, means for conducting a portion of the strong absorption liquid from the absorber to said lift in heat exchange relation with said weak liquid, means for conducting another portion of said strong absorption liquid from the absorber to said heat exchanging device, means for conducting the liquid from the heat exchanging device to said lift and means for conducting vapor from said generator to the heat exchanging device.

5. In an absorption refrigerating apparatus, an absorber having a liquid sump, a generator having a vapor liquid lift chamber located below the liquid level in said sump, a heat exchanging device below said level and above said chamber, means for conducting weak absorption liquid from said generator to said absorber, means for conducting a portion of the strong absorption liquid from said sump to the generator in heat exchange relation with said weak liquid, means for conducting another portion of said strong absorption liquid from said sump by gravity flow to said heat exchanging device, means for conducting liquid from said heat exchanging device to said lift chamber by gravity flow and means for conducting vapor from said generator to said heat exchanging device.

6. In an absorption refrigerating apparatus, a generator, a condenser, an absorber, a solution circuit for conducting weak solution from said generator to said absorber and strong solution from said absorber to said generator, vapor lift means for circulating said solution in said circuit, conduit means for conducting vapor from said generator to said condenser, said solution circuit including means to conduct a portion of said strong solution into heat exchange relation out of contact with vapor flowing from said generator to said condenser and another portion of said strong solution into heat exchange with weak solution leaving the boiler.

7. In an absorption refrigerating apparatus, a generator, a condenser, an absorber, means for flowing weak solution from said generator to said absorber, conduit means for vapor from said generator to said condenser including a rectifier, positioned below the liquid level in said absorber, means for flowing strong solution from said absorber into heat exchange with said rectifier by gravity to cool said rectifier and transfer heat from vapor in said rectifier to said strong solution and means for flowing liquid condensed in said rectifier and said strong solution by gravity to said generator, said last mentioned means including means for bringing said liquid and strong solution into contact with vapor leaving the generator.

8. That method of separating absorbent vapor from refrigerant vapor produced in an absorption refrigerating apparatus and in pre-heating cool strong solution which comprises passing strong solution in heat exchange with hot weak solution to partially heat the strong solution, passing said vapor mixture in heat exchange relation but out of contact with the partially heated strong solution of absorbent medium and refrigerant whereby the absorbent vapor is condensed and the heat of condensation is given up to the strong solution to liberate refrigerant vapor from said strong solution, conducting refrigerant vapor so liberated into the refrigerant vapor from which the absorbent vapor has been removed and further heating the strong solution by heat exchange with hot weak solution.

9. That process of exchanging heat between the fluids of an absorption refrigerating apparatus having a generator assembly for driving off refrigerant vapor from a solution and an absorber for reabsorbing the refrigerant vapor into the solution comprising, bringing strong cool solution from the absorber into heat exchange relationship with warm lean solution from said generator assembly in a first place of heat exchange to partially heat said strong solution, then bringing the partially heated strong solution into heat exchange with vapor from said generator assembly in a second place of heat exchange to condense solution vapor and transfer the heat of condensation to the strong solution and finally bringing the strong solution into a third place of heat exchange with hot lean solution coming directly from said generator assembly.

10. That process of exchanging heat between the fluids of an absorption refrigerating apparatus having a generator assembly for driving off refrigerant vapor from a solution and an absorber for reabsorbing the refrigerant vapor into the solution comprising, bringing strong cool solution from the absorber into heat exchange relationship with warm lean solution from the said generator assembly in a first place of heat exchange to partially heat said strong solution, then bringing the partially heated strong solution into heat exchange with vapors from said generator assembly in a second place of heat exchange to condense solution vapor and transfer the heat of condensation to the strong solution and finally bringing the strong solution and the condensed solution vapor into a third place of heat exchange with hot weak solution flowing directly from said generator assembly.

11. That process of exchanging heat between the fluids of an absorption refrigerator having a generator assembly for driving refrigerant vapor from a solution and an absorber for reabsorbing the vapor into the solution comprising, bringing strong solution from said absorber into heat exchange with weak solution from said generator assembly in one place of heat exchange after the weak solution has been partially cooled in another place of heat exchange by fluids flowing to said generator assembly to partially warm said strong solution, and thereafter bringing the partially warmed strong solution into heat exchange out of contact with in a third place of heat exchange with vapors from said generator assembly to condense solution vapor and transfer the heat of condensation to the strong solution.

12. That process of exchanging heat between the fluids of an absorption refrigerating apparatus having a generator assembly for driving refrigerant vapor from a solution and an absorber for reabsorbing the refrigerant vapor into the solution comprising, bringing strong solution from said absorber into heat exchange with weak solution from said generator assembly after the weak solution has been partially cooled by fluids flowing to said generator assembly to partially warm said strong solution, thereafter bringing the partially warmed strong solution into heat exchange with vapors from said generator assembly to condense solution vapor and transfer the heat of condensation to the strong solution and merging the condensate thus formed with the strong solution flowing to said generator assembly.

13. An absorption refrigerating apparatus comprising; a generator assembly for driving refrigerant vapor from a solution; an absorber for reabsorbing the refrigerant vapor into the solution; a closed circuit between said generator assembly and said absorber and means for circulating the mixture of refrigerant and solution through said closed circuit; said closed circuit including a three part heat exchange means between said generator assembly and said absorber; said exchange means comprising a first place of heat exchange for bringing strong solution flowing to said generator assembly into heat exchange with weak solution flowing to said absorber to partially heat the strong solution, a second place of heat exchange for bringing the partially heated strong solution into heat exchange out of contact with vapors flowing from said generator assembly to condense solution vapors and further heat said strong solution and a third place of heat exchange for bringing the further heated strong solution into heat exchange with hot weak solution directly flowing from said generator assembly.

14. An absorption refrigerating system having a circuit for absorption liquid including an absorber having a surface level of liquid therein, a generator vapor lift assembly having a surface level of liquid therein above that in said absorber, and heat exchange means, said exchange means being connected to conduct vapors and liquid from the generator and liquid flowing to the generator in heat transfer relation out of physical contact with each other, said exchange means also being located at a level below the said surface level of liquid in said absorber, and means for creating a third surface level of liquid in said circuit below a vapor portion of said heat exchange means to permit drainage of condensate from the vapor portion of said heat exchange means into said liquid circuit.

15. An absorption refrigerating apparatus comprising, an absorber having a surface level of liquid therein, a generator vapor lift assembly having a surface level of liquid therein above that in said absorber, a condenser, a triple pass heat exchange means, means for conducting vapor from said generator vapor lift assembly through one pass of said heat exchange means to said condenser, an absorption liquid circuit including means for conducting weak absorption liquid from said generator vapor lift assembly through a second pass of said heat exchange means to said absorber and means for conducting strong absorption liquid from said absorber through the third pass of said heat exchange means to said generator vapor lift assembly in heat exchange relationship with vapor flowing through said one pass, said exchange means being located at a level below the said surface level of liquid in said absorber, said circuit including means between said heat exchange means and said generator vapor lift assembly for creating a third surface level below at least a portion of said heat exchange means for permitting drainage of condensate from the vapor pass of said heat exchanger to said circuit.

CURTIS C. COONS.

REFERENCES CITED

The following references are of record in the file of this patent:

UNITED STATES PATENTS

| Number | Name | Date |
|---|---|---|
| 683,239 | Wilson | Sept. 24, 1901 |
| 925,920 | Kirn | June 22, 1909 |
| 943,040 | McKee | Dec. 14, 1909 |
| 1,767,639 | Altenkirch | June 24, 1930 |
| 1,955,697 | Altenkirch | Apr. 17, 1934 |
| 1,960,809 | Dahlgren | May 29, 1934 |
| 2,010,408 | Münters | Aug. 6, 1935 |
| 2,043,548 | Maiuri | June 9, 1936 |
| 2,096,093 | Drevet | Oct. 17, 1937 |
| 2,201,362 | Bergholm | May 21, 1940 |
| 2,203,074 | Anderson | June 4, 1940 |
| 2,215,674 | Ullstrand | Sept. 24, 1940 |
| 2,222,548 | Taylor | Nov. 19, 1940 |

FOREIGN PATENTS

| Number | Country | Date |
|---|---|---|
| 15,038 | Great Britain | Nov. 4, 1887 |